US011861952B2

(12) United States Patent
Kishimoto et al.

(10) Patent No.: US 11,861,952 B2
(45) Date of Patent: Jan. 2, 2024

(54) DRIVING SUPPORT DEVICE

(71) Applicant: HONDA MOTOR CO., LTD., Tokyo (JP)

(72) Inventors: Yuya Kishimoto, Saitama (JP); Takashi Nishioka, Saitama (JP); Masayuki Sato, Saitama (JP); Tomoko Nishino, Saitama (JP); Yuki Murayama, Saitama (JP); Kazuasa Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 17/678,018

(22) Filed: Feb. 23, 2022

(65) Prior Publication Data

US 2022/0309839 A1 Sep. 29, 2022

(30) Foreign Application Priority Data

Mar. 29, 2021 (CN) ......................... 202110334752.1

(51) Int. Cl.
*G07C 5/00* (2006.01)
*G07C 5/02* (2006.01)

(52) U.S. Cl.
CPC ............... *G07C 5/008* (2013.01); *G07C 5/02* (2013.01)

(58) Field of Classification Search
CPC .......... G07C 5/008; G07C 5/02; B60W 50/14
See application file for complete search history.

(56) References Cited

U.S. PATENT DOCUMENTS

| | | | | |
|---|---|---|---|---|
| 2019/0337533 | A1* | 11/2019 | Kume | B60W 50/14 |
| 2020/0031360 | A1* | 1/2020 | Suzuki | B60W 10/20 |
| 2020/0039468 | A1 | 2/2020 | Narumi et al. | |

FOREIGN PATENT DOCUMENTS

| | | | | |
|---|---|---|---|---|
| CN | 101859496 | * | 3/2010 | B62D 15/029 |
| CN | 104054117 | * | 1/2013 | G08G 1/096775 |
| JP | 2014020929 | * | 7/2012 | |
| JP | 2018063467 | A | 4/2018 | |
| JP | 2020077308 | * | 11/2018 | |
| JP | 2021184120 | * | 5/2020 | G09B 19/167 |

* cited by examiner

*Primary Examiner* — Hongmin Fan
(74) *Attorney, Agent, or Firm* — CKC & Partners Co., LLC

(57) ABSTRACT

A driving support device is provided which can evaluate the driving skill of a driver, and improve the driving skill of the driver. A driving support device 11 includes: a peripheral information acquisition unit 40; an outside-world detection unit 201; a driving status detection unit 202; a driving evaluation unit 203 which decides a driving evaluation indicating the driving skill of the driver of the vehicle 1, based on the outside-world detection result of detecting the predetermined target and the driving status; a voice output device 91 which notifies the driver of the driving evaluation result indicating the result of driving evaluation; and a notification control unit 204 which notifies the driver by way of the notification unit of the outside-world detection result or driving status based on the driving evaluation result, when the driving evaluation improves.

5 Claims, 7 Drawing Sheets

FIG. 5

| RISK RAISING CONDITION | RISK DECREASING CONDITION |
|---|---|
| APPROACHING WITHIN A PREDETERMINED INTER-VEHICLE DISTANCE | MAINTAIN AT LEAST PREDETERMINED INTER-VEHICLE DISTANCE |
| AT LEAST PREDETERMINED ACCELERATION | GENTLE DECELERATION |
| WEAVING WITHIN PREDETERMINED TIME | STABLE TRACKING AT CORNER, ETC. |
| RELATIVE SPEED WITH FORWARD VEHICLE AT LEAST PREDETERMINED VALUE | BRAKE CORRESPONDING TO FORWARD VEHICLE (BRAKE MAINTAINING RELATIVE DISTANCE) |
| ... | ... |

DRIVING SUPPORT DEVICE

This application is based on and claims the benefit of priority from Chinese Patent Application No. CN202110334752.1, filed on 29 Mar. 2021, the content of which is incorporated herein by reference.

BACKGROUND OF THE INVENTION

Field of the Invention

The present invention relates to a driving support device.

Related Art

Conventionally, a driver state estimation device has been proposed which determines the state of the driver of a vehicle using a plurality of thresholds, and notifies a warning to the driver (for example, refer to Patent Document 1).

Patent Document 1: Japanese Unexamined Patent Application, Publication No. 2018-063467

SUMMARY OF THE INVENTION

However, the driver state estimation device disclosed in Patent Document 1 only notifies a warning to the driver. On the other hand, in order to improve the driving ability of a driver, it is necessary to perform notification to the driver in the case of the state of the driver being appropriately improved.

Therefore, the present invention has an object of providing a driving support device which can evaluate the driving ability of a driver to improve the driving ability of the driver.

A driving support device (for example, the driving support device 11 described later) according to one aspect of the present disclosure includes: a peripheral information acquisition unit (for example, the peripheral information acquisition unit 40 described later) which acquires peripheral information of surroundings of a moving body (for example, the vehicle 1 described later); an outside-world detection unit (for example, the outside-world detection unit 201 described later) which detects a predetermined target in surroundings of the moving body based on the peripheral information; a driving status detection unit (for example, the driving status detection unit 202 described later) which detects a driving status including a steering status and a braking status of the moving body; a driving evaluation unit (for example, the driving evaluation unit 203 described later) which decides a driving evaluation indicating a driving skill of the driver of the moving body, based on an outside-world detection result of detecting the predetermined target and the driving status; a notification unit (for example, the voice output device 91 or portable communication device 100 described later) which notifies the driver of the driving evaluation result indicating a result of the driving evaluation; and a notification control unit (for example, the notification control unit 204 described later) which notifies the driver by way of the notification unit of the outside-world detection result or the driving status, based on the driving evaluation result, when the driving evaluation improves.

In addition, the driving evaluation unit stores transitions in driving evaluation of the driver based on the outside-world detection result and the driving status in a storage unit; the driving support device further includes a driving evaluation determination unit (for example, the driving evaluation determination unit 205 described later) which determines that the driving evaluation improved, in the case of the outside-world detection result and the driving status matching a first condition, and determines that the driving evaluation declined in a case of the outside-world detection result and the driving status matching a second condition; the notification control unit notifies the driver by way of the notification unit of the driving evaluation result indicating that the driving evaluation improved in a case of being determined that the driving evaluation improved, and does not notify the driver by way of the notification unit of the driving evaluation result indicating that the driving evaluation declined in a case of being determined that the driving evaluation declined; the driving evaluation determination unit determines that the driving evaluation declined by two levels, in a case of the outside-world detection result and the driving status matching the second condition a plurality of times within a predetermined time period; and the notification control unit performs a warning to the driver by way of the notification unit, in case of the driving evaluation declining by two levels.

Furthermore, the driving evaluation determination unit determines that the driving evaluation declined, in a case of the outside-world detection result and the driving status matching the second condition; and the notification control unit notifies the driver by way of the notification unit of the driving evaluation result indicating that the driving evaluation declined, and the outside-world detection result or the driving status based on the driving evaluation result, after stopping of the moving body.

Moreover, the driving support device further includes a communication unit (for example, described later) which communicates with an external terminal (for example, the portable communication device 100 described later), in which the notification control unit sends the driving evaluation result to the external terminal by way of the communication unit, and notifies the driving evaluation result and the outside-world detection result or the driving status based on the driving evaluation result to the external terminal.

Additionally, the first condition includes a relative distance between the moving body and a forward vehicle traveling ahead of the moving body becoming at least a predetermined distance, and traveling at the predetermined distance or more for a predetermined time period; and the second condition includes a relative distance from the forward vehicle becoming no more than a predetermined distance, or accelerating the moving body at an acceleration of at least a predetermined acceleration.

According to the present invention, it is possible to provide a driving support device which can evaluate the driving ability of a driver to improve the driving ability of the driver.

BRIEF DESCRIPTION OF THE DRAWINGS

FIG. 5 is a view showing a specific example of a risk raising condition and risk machining condition;

DETAILED DESCRIPTION OF THE INVENTION

Figure 1:
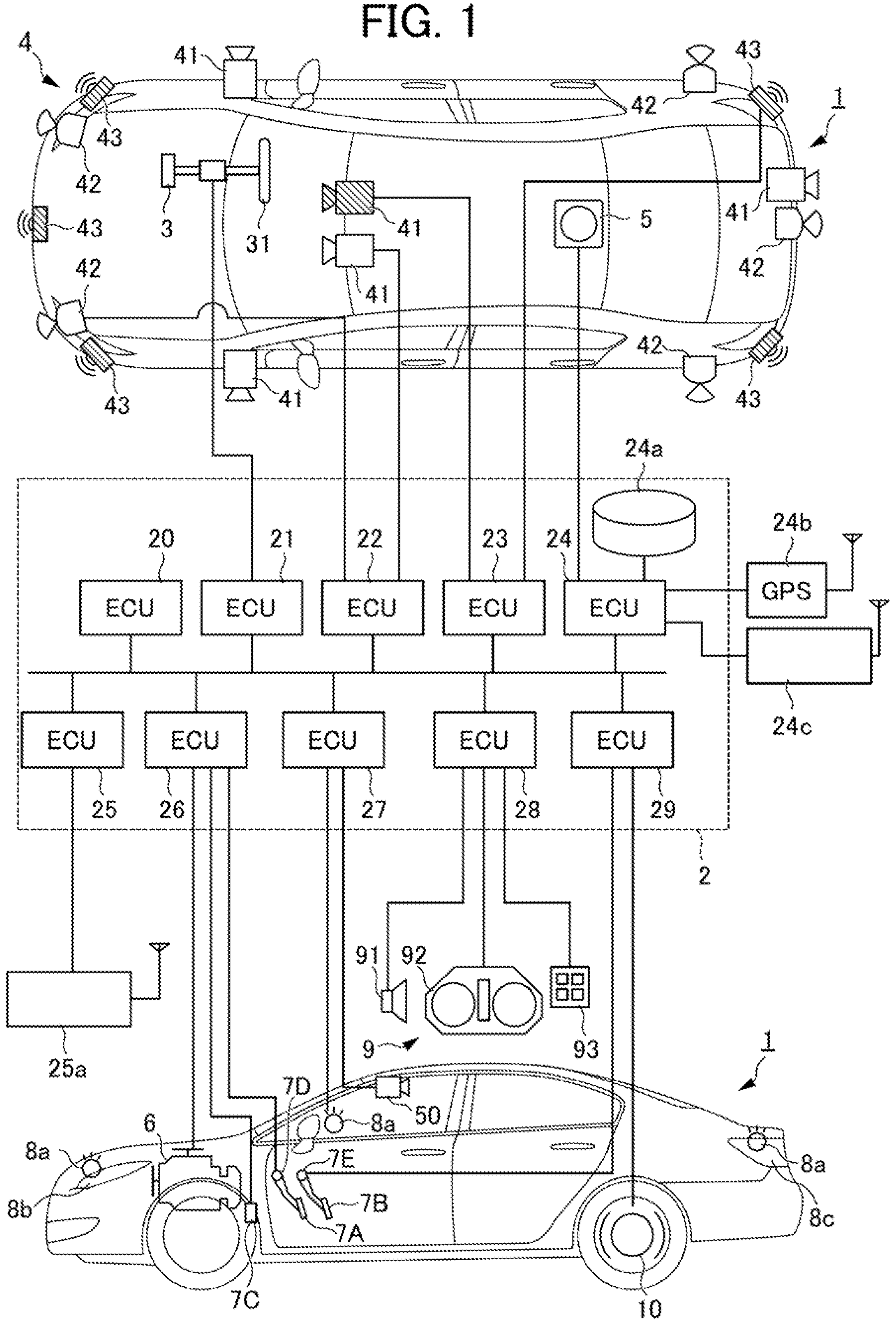
FIG. 1 is a block diagram showing the configuration of a vehicle according to the present embodiment.

Hereinafter, an embodiment of a driving support device of the present invention will be explained while referencing the drawings. FIG. 1 is a block diagram showing the configuration of a vehicle 1 according to the present embodiment. FIG. 1 shows an outline of the vehicle 1 by combining a plan view and a side view. The vehicle 1 is a four-wheeled occupant car of sedan type as one example.

The vehicle 1 includes a control device 2. The control device 2 includes a plurality of ECUs (automatic driving ECU 20~stop control ECU 29) connected to enable transmitting by way of an onboard network. Each ECU functions as a computer including a processor of which a CPU is representative, a storage device such as semiconductor memory, an interface such as an external device, etc. The program executed by a processor, and data used in processing by the processor, etc. are stored in the storage device. Each ECU may include a plurality of processors, storage devices, interfaces, etc.

Hereinafter, the function of each automatic driving ECU 20 to stop control ECU 29, etc. will be explained. It should be noted that the number of ECUs and corresponding functions can be set appropriately, and can be subdivided or integrated more than the ECUs shown in the present embodiment.

The automatic driving ECU 20 executes control for automatic driving of the vehicle 1. In automatic driving, the automatic driving ECU 20 automatically controls at least one of steering of the vehicle 1, or acceleration and deceleration.

A steering ECU 21 controls an electric power steering device 3. The electric power steering device 3 includes a mechanism which steers front wheels in response to a driving operation (steering operation) of the driver on a steering wheel 31. In addition, the electric power steering device 3 includes a motor which exerts a driving force for assisting a steering operation or automatically steering the front wheels; a sensor detecting the steering angle; etc. In the case of the driving state of the vehicle 1 being automatic driving, the steering ECU 21 automatically controls the electric power steering device 3 in response to the instruction from the automatic driving ECU 20, and controls the travel direction of the vehicle 1.

Travel support ECUs 22 and 23 perform control of a camera 41, LIDAR 42 and millimetric wave radar 43, which detect the ambient conditions of the vehicle, and information processing of detection results. The camera 41 images the front, sides and rear of the vehicle 1. In the case of the present embodiment, two of the cameras 41 are provided at the front of the vehicle 1, and one is provided to each side and the rear. The travel support ECUs 22 and 23 can extract an outline of a target, and extract dividing lines of lanes on a road (white lines, etc.), by analysis of the images captured by the camera 41.

The LIDAR 42 is Light Detection and Ranging (LIDAR), detects landmarks of the surroundings of the vehicle 1, and measures the distance from landmarks. In the case of the present embodiment, five LIDAR 42 are provided, one being provided to each corner at the front of the vehicle 1, one at the center in the rear, and one at each side in the rear.

The millimetric wave radar 43 detects landmarks of the surroundings of the vehicle 1, and measures the distance from the landmarks. In the case of the present embodiment, five millimetric wave radar 43 are provided, one being provided at the center in the front of the vehicle 1, one at each corner in the front, and one provided at each corner in the rear.

The travel support ECU 22 performs control of one camera 41 in the front of the vehicle 1 and each LIDAR 42, and information processing of detection results. The travel support ECU 23 performs control of another camera 41 in the front of the vehicle 1 and each millimetric wave radar 43, and information processing of detection results. It is possible to improve the reliability of detection results by equipping two groups of ECUs detecting the ambient conditions of the vehicle 1, and it is possible to perform multi-faceted analysis of the surrounding environment of the vehicle 1, by equipping detection units of different types such as the camera 41, LIDAR 42 and millimetric wave radar 43.

A position recognition ECU 24 performs controls of a gyro sensor 5, GPS sensor **24*b* and communication device 24*c*, and performs information processing of detection results or communication results. The gyro sensor 5 detects gyration of the vehicle 1. The position recognition ECU 24 can determine the route of the vehicle 1, according to the detection results of the gyro sensor 5**, wheel speed, etc.

The GPS sensor **24*b* detects the current position of the vehicle 1. The communication device 24*c* performs wireless communication with a server that provides map information, traffic information, etc. The position recognition ECU 24 can access a database 24*a* of map information constructed in the storage device, and the position recognition ECU 24** performs route guidance from a current location to a destination, etc.

The communication control ECU 25 includes a communication device **25*a* for inter-vehicle communication. The communication device 25*a*** performs wireless communication with other vehicles in the surroundings, and performs information exchange between vehicles.

The drive control ECU 26 controls a power plant 6. The power plant 6 is a mechanism which outputs driving force causing the drive wheels of the vehicle 1 to rotate, and includes an engine and transmission, for example. The drive control ECU 26, for example, controls the output of the engine in response to driving operation (acceleration operation or acceleration operation) of the driver detected by an operation detection sensor 7D provided to the accelerator pedal 7A. Then, the drive control ECU 26 switches the variable speed level of the transmission based on information of the vehicle speed, etc. detected by the vehicle speed sensor 7C. In the case of the driving state of the vehicle 1 being automatic driving, the drive control ECU 26 automatically controls the power plant 6 in response to the instruction from the automatic driving ECU 20, and controls acceleration/deceleration of the vehicle 1.

A vehicle external notification control ECU 27 controls a lighting system 8 such as the directional indicators (winkers) **8*a*, the headlights 8*b* and tail lights 8*c* (refer to FIG. 3 described later). In the case of the example in FIG. 1, the directional indicators 8*a* are provided to the front of the vehicle 1, door mirrors and rear. The head lights 8*b* are provided to the front of the vehicle 1, and the tail lights 8*c* are provided to the rear of the vehicle 1. The vehicle external notification control ECU 27 further controls an acoustic system 12 generating sound to the vehicle exterior. The acoustic system 12, for example, includes a horn 12*a* for honking (refer to FIG. 3** described later).

A vehicle internal notification control ECU 28 performs control of an input/output device 9. The input/output device 9 performs output of information to the driver, and reception of inputs of information from the driver. The input/output device 9 has a voice output device 91, display device 92 and input device 93.

The voice output device 91 reports informed by way of voice to the driver. The display device 92 notifies information by the display of images to the driver. The display device 92 is arranged in front of the driver's seat, and configures an instrument panel, etc. It should be noted that although voice and display are exemplified herein, it may notify of information by vibration or light. In addition, the input/output device 9 may notify information by combining a plurality of voice, display, vibration or light. Furthermore, the input/output device 9 may differentiate the combinations according to the level of information to notify (for example, urgency), and differentiate the notification mode.

The input device 93 is arranged at a position allowing operation by the driver, and is a switch group for performing instruction to the vehicle 1; however, it may include a voice input device.

The stop control ECU 29 controls the brake device 10 and parking brake (not shown). The brake device 10 is a disc brake device, for example, is provided to each wheel of the vehicle 1, and causes the vehicle 1 to decelerate or stop by applying resistance to rotation of the wheels.

The stop control ECU 29, for example, controls operation of the brake device 10 in response to a driving operation (brake operation) of the driver detected by an operation detection sensor 7E provided to the brake pedal 7B. In the case of the driving state of the vehicle 1 being automatic driving, the stop control ECU 29 automatically controls the brake device 10 in response to instruction from the ECU 20, and controls deceleration and stopping of the vehicle 1. The brake device 10 and parking brake can operate in order to maintain the stopped state of the vehicle 1. In addition, in the case of the transmission of the power plant 6 including a parking lock mechanism, this parking lock mechanism can operate in order to maintain the stopped state of the vehicle 1.

The vehicle 1 further includes a vehicle interior detection sensor 50 for detecting the state of the vehicle interior. Herein, the vehicle interior detection sensor 50 is configured from a camera as an imaging unit, a weight sensor, temperature detection sensor, etc., and the types thereof are not particularly limited. It should be noted that the vehicle interior detection sensor 50 may be provided to every seat provided in the vehicle 1, or may be provided in a single configuration such that can overlook and monitor the entire vehicle interior.

(Examples of Control Functions)

The control functions of the vehicle 1 according to the present embodiment include travel-related functions involved in the control of driving, braking and steering of the vehicle 1, and a notification functions involved in notification of information relative to the driver. Lane maintaining control is one control of the position of the vehicle relative to a lane, and is control for causing the vehicle to automatically travel (irrespective of the driving operation of the driver) on a traveling track set in the lane.

Lane deviation suppressing control is one control of the position of the vehicle relative to the lane, and is control which detects white lines or a median divider, and performs automatic steering so that the vehicle does not cross the lines. The functions differ in this way between the lane maintaining control and the lane deviation suppressing control.

Lane changing control is control which causes the vehicle to automatically move from the lane in which the vehicle is currently traveling to the adjacent lane. Forward vehicle tracking control is control which automatically follows another vehicle traveling ahead of one's own vehicle. Collision mitigation brake control is control which automatically brakes to help collision avoidance, in the case of the collision probability with an obstacle ahead of the vehicle rising. False start suppressing control is control which limits acceleration of the vehicle to suppress sudden start, in the case of the acceleration operation from the driver in a stopped state of the vehicle being at least a predetermined amount.

Adjacent vehicle notifying control is control which notifies the driver of the existence of another vehicle traveling in an adjacent lane adjacent to the travel lane of one's own vehicle, for example, notifies of the existence of another vehicle traveling ahead or behind one's own vehicle. Forward vehicle start notifying control is control notifying of one's own vehicle and another vehicle ahead of this being in the stopped state, and the other vehicle ahead starting off. These notifications can be performed by the aforementioned vehicle internal notification device.

Figure 2:
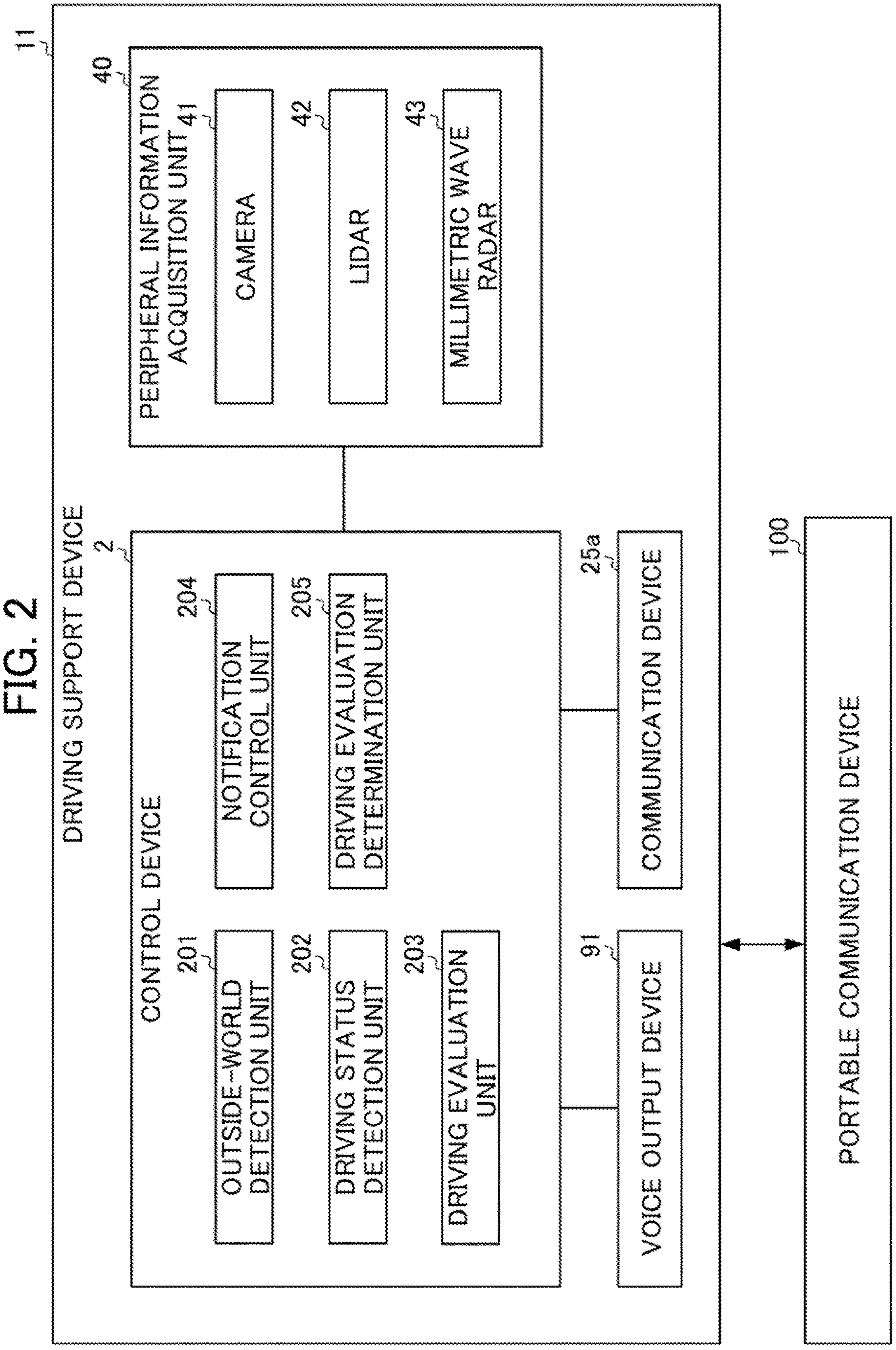
FIG. 2 is a view showing the functional configuration of a driving support device of the vehicle according to the present embodiment.

Hereinafter, processing of the driving support device 11 of the vehicle 1 according to the present embodiment will be explained. FIG. 2 is a view showing the functional configuration of the driving support device 11 of the vehicle 1 according to the present embodiment. As shown in FIG. 2, the driving support device 11 includes the control device 2, communication device 25*a*, and peripheral information acquisition unit 40.

The control device 2 includes the outside-world information detection unit 201, driving status detection unit 202, driving evaluation unit 203, notification control unit 204 and driving evaluation determination unit 205. The peripheral information acquisition unit 40 includes the aforementioned camera 41, LIDAR 42 and millimetric wave radar 43.

The peripheral information acquisition unit 40 acquires peripheral information of the vehicle 1. For example, the peripheral information acquisition unit 40 acquires peripheral information of the front, sides and rear of the vehicle 1. The peripheral information is images of the periphery at the front, sides and rear of the vehicle 1 acquired by the camera 41, for example. In addition, the peripheral information may be data of the periphery at the front, sides and rear of the vehicle 1 acquired by the LIDAR 42 or millimetric wave radar 43, for example.

The outside-world detection unit 201 detects a predetermined target (for example, other vehicle) in the surroundings of the vehicle 1, based on the peripheral information acquired by the peripheral information acquisition unit 40.

The driving status detection unit 202 detects the driving status including the steering status and braking status of the vehicle 1. Herein, steering status is the status of the steering operation of the driver relative to the steering wheel 31. Braking status is the status of braking of the vehicle 1 by the brake device 10 and parking brake.

The driving evaluation unit 203 determines the driving evaluation indicating the driving skill of the driver of the vehicle 1, based on the outside-world detection results of detecting the other vehicle and the driving status. The outside-world detection result is the result of detecting the other vehicle, for example, and includes the positional information, speed information, etc. of the other vehicle. The driving evaluation, for example, is a driving evaluation level indicating the driving skill of the driver of the vehicle 1. Details of the driving evaluation level will be described later.

In addition, the driving evaluation unit 203 stores the transitions of driving evaluation of the driver based on the outside-world detection result and driving status in a storage device of the control device 2.

The notification control unit 204 notifies the driver by the voice output device 91 or portable communication device 100 of the outside-world detection result or driving status, based on the driving evaluation result indicating the result of driving evaluation, when the driving evaluation improves. Herein, driving evaluation result is a message according to the driving evaluation level, for example.

In addition, the voice output device 91 outputs by voice a message according to the driving evaluation level. The portable communication device 100 outputs by voice a message according to the driving evaluation level, or displays on a display unit 104 described later, with the message according to the driving evaluation level as text data.

The driving evaluation determination unit 205 determines that the driving evaluation improved, in the case of the outside-world detection result and driving status matching a first condition (for example, risk lowering condition described later). In addition, the driving evaluation determination unit 205 determines that the driving evaluation declined, in the case of the outside-world detection result and driving status matching a second condition (for example, risk raising condition described later).

The notification control unit 204 notifies the driver by the voice output device 91 or portable communication device 100 of the driving evaluation result indicating that the driving evaluation improved, in the case of being determined that the driving evaluation improved. In the case of being determined that the driving evaluation declined, the notification control unit 204 notifies the driver not immediately of the driving evaluation results indicating that the driving evaluation declined by the voice output device 91 or portable communication device 100, but rather after the vehicle 1 turns OFF the ignition power.

The driving evaluation determination unit 205 determines that the driving evaluation declined two levels, in the case of the outside-world detection result and driving status matching the second condition a plurality of times within a predetermined time period. The notification control unit 204 performs warning to the driver by the voice output device 91 or portable communication device 100, in the case of the driving evaluation declining two levels.

The driving evaluation determination unit 205 determines that the driving evaluation declined in the case of the outside-world detection result and driving status matching the second condition, and stores the driving evaluation result in the storage device of the control device 2. The notification control unit 204, after stopping the vehicle 1 (for example, ignition power is OFF), notifies the driver by way of the voice output device 91 or portable communication device 100 of the driving evaluation result indicating that the driving evaluation declined, and the outside-world detection result or driving status, based on the driving evaluation result.

In addition, the notification control unit 204 sends the driving evaluation result to the portable communication device 100 by way of the communication device 25*a*, and notifies of the driving evaluation result and the outside-world detection result or driving status based on the driving evaluation result to the portable communication device 100.

In addition, the aforementioned first condition includes, for example, the relative distance between the vehicle 1 and a forward vehicle traveling ahead of the vehicle 1 becoming at least a predetermined distance, and traveling for a predetermined time period for at least the predetermined distance. The second condition includes, for example, the relative distance between the vehicle 1 and the forward vehicle becoming no more than a predetermined distance, and accelerating the vehicle 1 at an acceleration of at least a predetermined acceleration.

Figure 3:
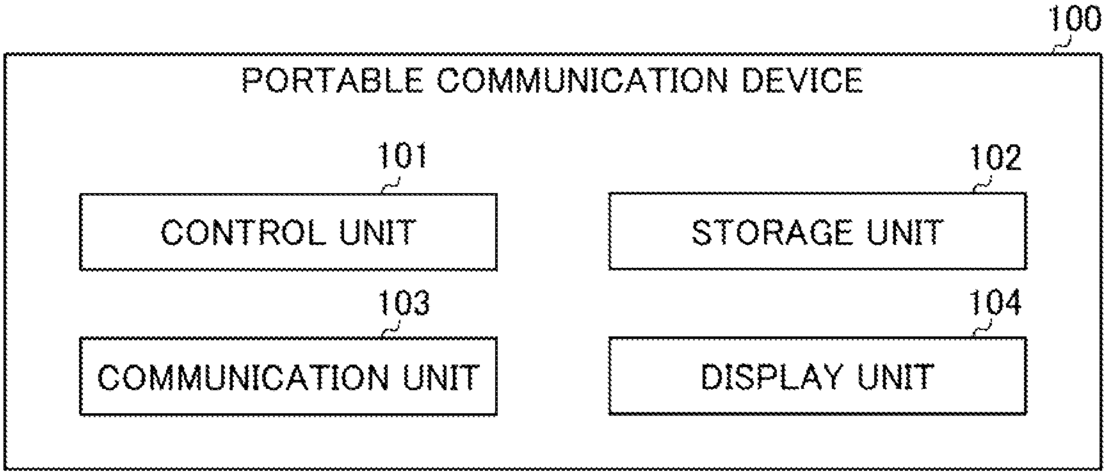
FIG. 3 is a view showing the functional configuration of a portable communication device according to the present embodiment.

FIG. 3 is a view showing the functional configuration of the portable communication device 100 according to the present embodiment. The portable communication device 100 according to the present embodiment includes a control unit 101, storage unit 102, communication unit 103 and display unit 104.

The control unit 101 is a portion which controls the overall of the portable communication device 100, and realizes various functions in the present embodiment, by appropriately reading out and executing various programs stored in the storage unit 102. The control unit 101 may be a CPU (Central Processing Unit).

The storage unit 102 is a storage region of various programs for causing hardware groups to function as the portable communication device 100, various data, etc., and may be ROM, RAM, flash memory or a hard disk (HDD). More specifically, the storage unit 102 stores programs, etc. causing each function of the present embodiment to be executed in the control unit 101.

The communication unit 103 performs communication control for the portable communication device 100 to communicate with external equipment. More specifically, the communication unit 103 handles predetermined communication protocols (for example, WiFi, 3G, 4G, 5G, etc.). The communication unit 103 communicates with external equipment in accordance with the control of the control unit 101, using these communication protocols.

The portable communication device 100 can communicate with the driving support device 11 by way of the communication unit 103, and stores application programs for driving support in the storage unit 102. Then, the application programs for driving support notify the driver of driving evaluation results, by displaying the driving evaluation result on the display unit 104 as text data, when receiving driving evaluation results from the driving support device 11.

Figure 4:
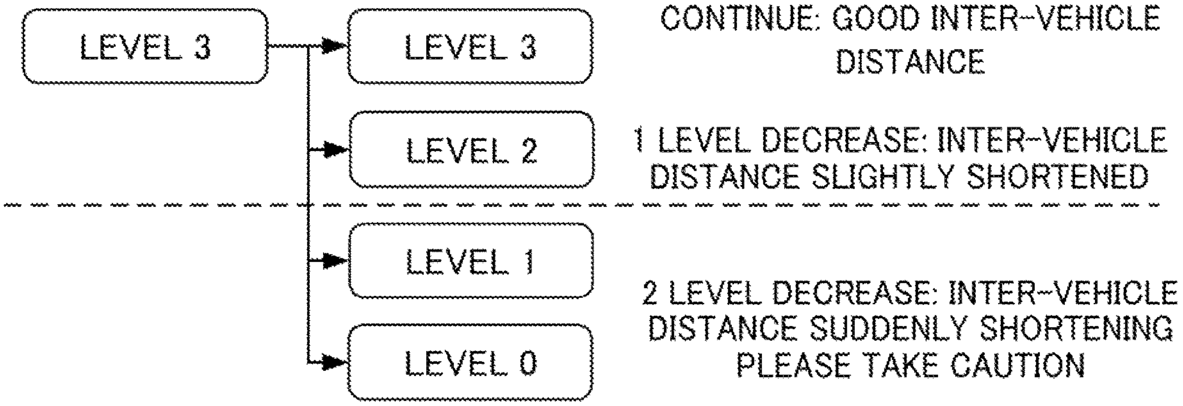
FIG. 4 is a view showing transitions of driving evaluation levels.

FIG. 4 is a view showing transitions of driving evaluation levels. The driving evaluation unit 203 of the driving support device 11 has a follow training function for the driver of the vehicle 1 to travel by following the forward vehicle. The follow training function, for example, starts and ends by an operation of the input device 93 by the driver.

In the follow training function, the task required of the driver of the vehicle 1 is to maintain for 30 seconds a state in which the inter-vehicle time between the vehicle 1 and forward vehicle is at least 2 seconds. Herein, the inter-vehicle time is the time from when the forward vehicle passes a certain site until the vehicle 1 passes this site.

In addition, a condition of operating the follow training function includes the vehicle 1 traveling at a speed of at least 30 km/h, and the vehicle 1 being a state able to detect the forward vehicle. Then, the follow training function notifies the driver by way of the voice output device 91 of the driving evaluation result (for example, message) according to the driving evaluation level, to the driver of the vehicle 1.

The driving evaluation level is a number representing the driving evaluation indicating the driving skill of the driver of the vehicle 1. The driving evaluation levels are the four levels of 0 to 3, and indicate that the driving skill of the driver is superior as the number increases.

As shown in FIG. 4, in the case of maintaining the state of the driving evaluation level 3, the notification control unit 204 notifies to the driver by way of the voice output device 91 of a message "good inter-vehicle distance" which indicates maintaining a good driving evaluation level, as the driving evaluation result.

In the case of transitioning from the driving evaluation level 3 to the driving evaluation level 2, i.e. case of the driving evaluation declining by one level, the notification control unit 204 notifies to the driver by way of the voice output device 91 of a message "inter-vehicle distance became slightly shorter", which indicates that the driving evaluation level declined by one level, as the driving evaluation result.

In the case of transitioning from the driving evaluation level 3 to the driving evaluation level 1 or driving evaluation level 0, i.e. case of driving evaluation declining by at least two levels, the notification control unit 204 notifies to the driver by way of the voice output device 91 of a message "inter-vehicle distance suddenly became shorter. Please take caution", which indicates that the driving evaluation level declined by two levels, as the driving evaluation result.

FIG. 5 is a view showing a specific example of risk rising condition and risk decreasing condition. As shown in FIG. 5, the risk raising condition includes: the inter-vehicle distance between the vehicle 1 and forward vehicle approaching within a predetermined inter-vehicle distance, acceleration of the vehicle 1 being at least a predetermined acceleration, steering of the vehicle 1 weaving within a predetermined time, and the relative speed between the vehicle 1 and forward vehicle being at least a predetermined value.

The risk decreasing condition includes: the inter-vehicle distance between the vehicle 1 and forward vehicle maintaining at least a predetermined inter-vehicle distance, the acceleration of the vehicle 1 showing gentle deceleration, steering of the vehicle 1 at a curve, corner of the like of a road showing smooth tracking without sudden steering, brake operation corresponding to the forward vehicle being performed (i.e. brake operation maintaining relative distance being performed), etc.

Then, the driving evaluation determination unit 205 determines that the driving evaluation improved, in the case of the outside-world detection result and driving status matching at least one of the above-mentioned risk decreasing condition. In addition, the driving evaluation determination unit 205 determines that the driving evaluation declined, in the case of the outside-world detection result and driving status matching at least one of the above-mentioned risk raising condition.

Figure 6:
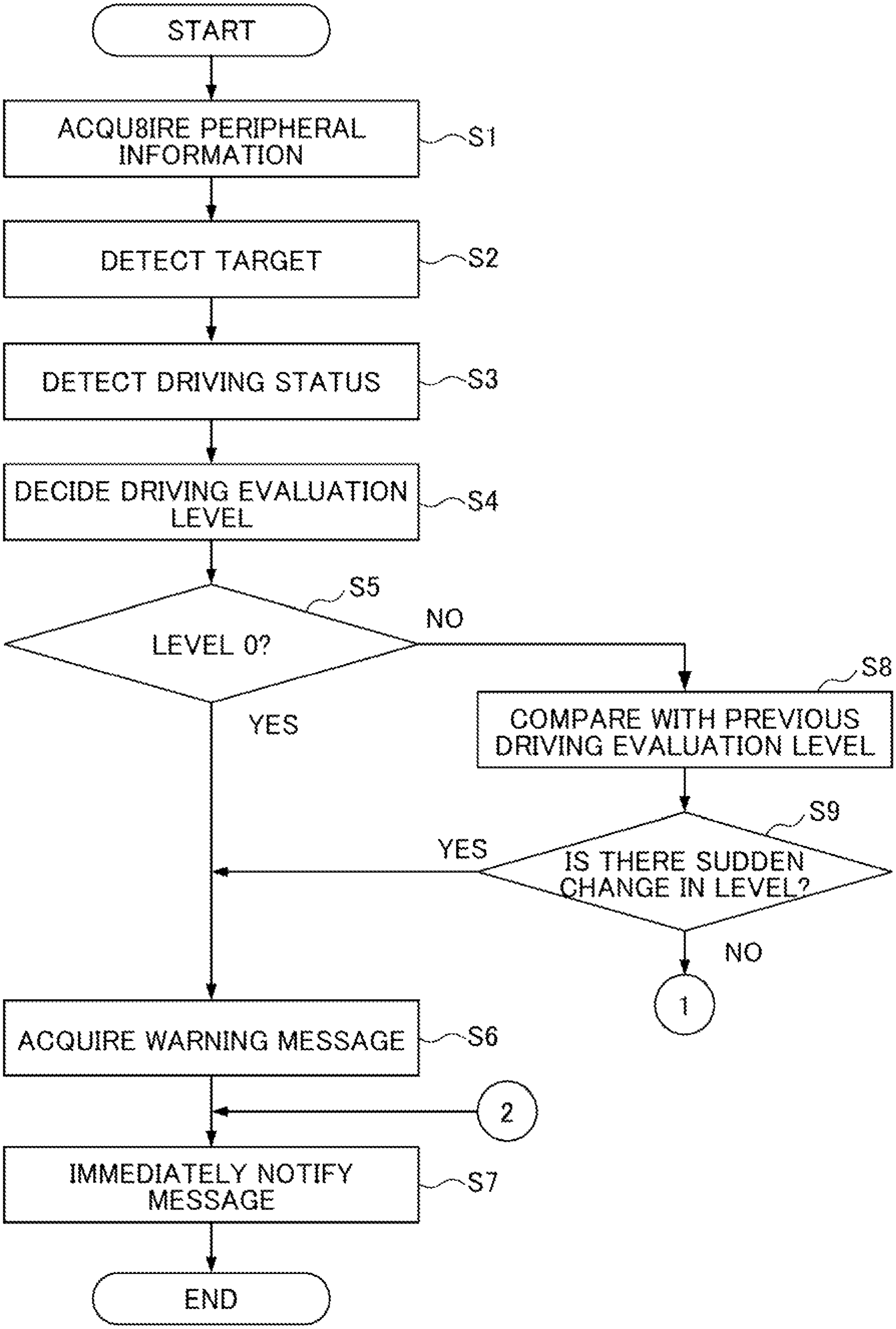
FIG. 6 is a flowchart showing processing of the driving support device according to the present embodiment.
Figure 7:
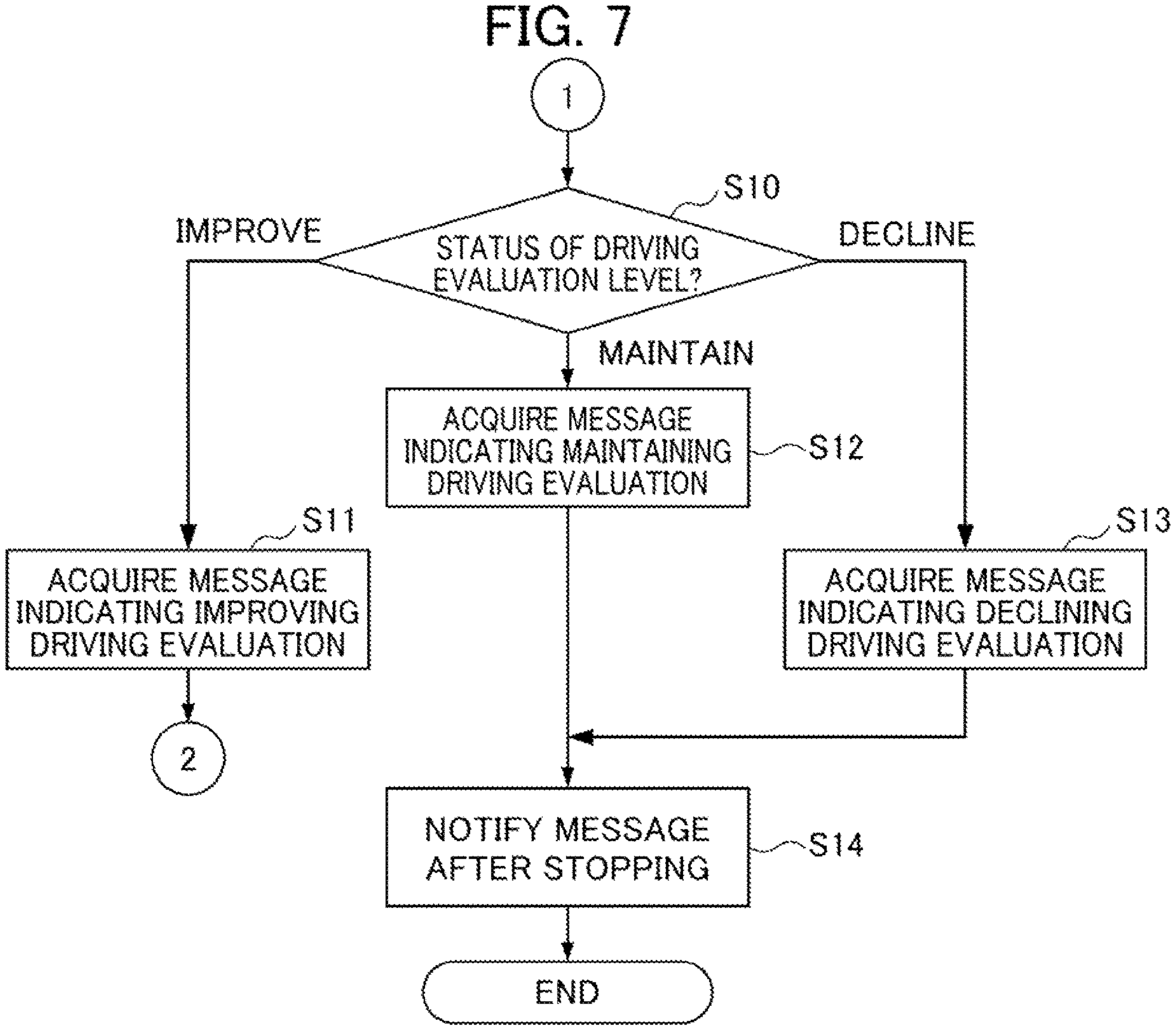
FIG. 7 is a flowchart showing processing of the driving support device according to the present embodiment.

FIGS. 6 and 7 are flowcharts showing processing of the driving support device 11 according to the present embodiment. In Step S1, the peripheral information acquisition unit 40 acquires peripheral information at the front, sides and rear of the vehicle 1.

In Step S2, the outside-world detection unit 201 detects the other vehicle in the surroundings of the vehicle 1, based on the peripheral information acquired by the peripheral information acquisition unit 40. In Step S3, the driving status detection unit 202 detects the driving status including the steering status and braking status of the vehicle 1.

In Step S4, the driving evaluation unit 203 decides the driving evaluation level indicating the driving skill of the driver of the vehicle 1, based on the outside-world detection result of detecting the other vehicle and the driving status.

In Step S5, the driving evaluation determination unit 205 determines whether the driving evaluation level is 0. In the case of the driving evaluation level being 0 (YES), the processing advances to Step S6. On the other hand, in the case of the driving evaluation level not being 0 (NO), the processing advances to Step S8.

In Step S6, the notification control unit 204 acquires a warning message indicating that the driving evaluation level declined, from the storage device of the control device 2.

In Step S7, the notification control unit 204 notifies the acquired message to the driver of the vehicle 1 immediately by way of the voice output device 91 or portable communication device 100.

In Step S8, the driving evaluation determination unit 205 compares the driving evaluation level decided in Step S4 with the previous driving evaluation level.

In Step S9, the driving evaluation determination unit 205 determines whether there is a sudden change in the driving evaluation level as a result of the comparison in Step S8 (change in driving evaluation level of at least two levels). In the case of there being a sudden change in driving evaluation level (YES), the processing advances to Step S6. On the other hand, in the case of there not being a sudden change in driving evaluation level (NO), the processing advances to Step S10 in FIG. 7.

In Step S10, the driving evaluation determination unit 205 determines the status of the driving evaluation level decided in Step S4. In the case of being determined that the driving evaluation level improved, the processing advances to Step S11. In the case of being determined that the driving evaluation is maintained, the processing advances to Step S12. In the case of being determined that the driving evaluation level declined, the processing advances to Step S13.

In Step S11, the notification control unit 204 acquires a message indicating that the driving evaluation level improved from the storage device of the control device 2, and advances to Step S7 in FIG. 6.

In Step S12, the notification control unit 204 acquires a message indicating that the driving evaluation level is maintained from the storage device of the control device 2, and advances to Step S14.

In Step S13, the notification control unit 204 acquires a message indicating that the driving evaluation level declined from the storage device of the control device 2, and advances to Step S14.

In Step S14, the acquired message is notified after the vehicle 1 turns OFF the ignition power, without immediately notifying the driver of the vehicle 1 by the voice output device 91 or portable communication device 100.

In this way, the driving support device 11 performs notification and warning according to transition of the driving evaluation level (improvement or decline in driving evaluation level), without performing notification and warning according to the decided driving evaluation level.

According to the present embodiment, for example, the following effects are exerted. The driving support device 11 includes: the peripheral information acquisition unit 40 which acquires peripheral information of the periphery of the vehicle 1; the outside-world detection unit 201 which detects a predetermined target in the surroundings of the vehicle 1 based on the peripheral information; the driving status detection unit 202 which detects the driving status including the steering status and braking status of the vehicle 1; the driving evaluation unit 203 which decides a driving evaluation indicating the driving skill of the driver of the vehicle 1, based on the outside-world detection result of detecting the predetermined target and the driving status; the voice output device 91 which notifies the driver of the driving evaluation result indicating the result of driving evaluation; and the notification control unit 204 which notifies the driver by way of the notification unit of the outside-world detection result or driving status based on the driving evaluation result, when the driving evaluation improves.

The driving support device 11 can thereby evaluate the driving ability of the driver, and improve the driving ability of the driver. In particular, the driving support device 11 can contribute to a driving ability improvement of the driver by notifying of the driving evaluation of the driver having improved, for example, can prompt continuous use of the aforementioned follow training function.

In addition, the driving evaluation unit 203 stores a transition in driving evaluation of the driver based on the outside-world detection result and driving status in the storage device of the control device 2, the driving support device 11 further includes the evaluation determination unit 205 which determines that the driving evaluation improved in the case of the outside-world detection result and driving status matching the first condition, and determines that the driving evaluation declined in the case of the outside-world detection result and driving status matching the second condition.

The notification control unit 204 notifies the driver by way of the voice output device 91 of the driving evaluation result indicating that the driving evaluation improved in the case of being determined that the driving evaluation improved, and does not notify the driver by way of the voice output device 91 of the driving evaluation result indicating that the driving evaluation declined in the case of being determined that the driving evaluation declined. In addition, the driving evaluation determination unit 205 determines that the driving evaluation declined by two levels in the case of the outside-world detection result and driving status matching the second condition a plurality of times within a predetermined time period, and the notification control unit 204 performs warning to the driver by way of the voice output device 91 in the case the driving evaluation having declined by two levels.

The drive support device 11 can thereby immediately perform feedback related to the driving evaluation to the driver, by performing notification to the driver in the case of the driving evaluation improving, and the case of the driving evaluation suddenly declining.

In addition, the driving evaluation determination unit 205 determines that the driving evaluation declined in the case of the outside-world detection result and driving status matching the second condition, and after stopping the vehicle 1, the notification control unit 204 notifies the driver by way of the voice output device 91 of the driving evaluation result indicating that the driving evaluation declined, and the outside-world detection result or driving status based on the driving evaluation result. The driving support device 11 can thereby, in the case of the decline in driving evaluation being slight, confirm the total driving evaluation later, without distracting the attention while driving, by performing notification collectively after stopping of the vehicle 1.

In addition, the driving support device 11 further includes the communication device **25*a* which communicates with an external terminal, and the notification control unit 204 sends the driving evaluation result to the portable communication device 100 by way of the communication device 25*a* to notify the driving evaluation result and outside-world detection result or the driving status based on the driving evaluation result to the portable communication device 100. By the driving support device 11 notifying of the driving evaluation result to the portable communication device 100, the driver can thereby appropriately perform confirmation of the driving evaluation using the portable communication device 100**.

In addition, the first condition includes: the relative distance between the vehicle 1 and the forward vehicle traveling ahead of the vehicle 1, and traveling at the predetermined distance or more for a predetermined time period, and the second condition includes: the relative distance from the forward vehicle becoming no more than the predetermined distance, or the vehicle 1 accelerated at an acceleration of a predetermined acceleration or more. The driving support device 11 can thereby determine an improvement or decline in driving evaluation, using the relationship with the forward vehicle.

Although an embodiment of the present invention has been explained above, the above-mentioned driving support device 11 can be realized by hardware, software or a combination of these. In addition, the control method performed by the above-mentioned driving support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes various types of tangible storage media. Examples of non-transitory computer readable media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although an embodiment of the present invention has been explained above, the present invention is not to be limited thereto. The configurations of detailed parts may be modified as appropriate within the scope of the gist of the present invention.

EXPLANATION OF REFERENCE NUMERALS

1 vehicle
11 driving support device
**25*a*** communication device
40 peripheral information acquisition unit
91 voice output device
100 portable communication device
201 outside-world detection unit
202 driving status detection unit
203 driving evaluation unit
204 notification control unit
205 driving evaluation determination unit

What is claimed is:

1. A driving support device comprising:

a peripheral information acquisition unit which acquires peripheral information of surroundings of a moving body;

an outside-world detection unit which detects a predetermined target in surroundings of the moving body based on the peripheral information;

a driving status detection unit which detects a driving status including a steering status and a braking status of the moving body;

a driving evaluation unit which decides a driving evaluation indicating a driving skill of driver of the moving body, based on an outside-world detection result of detecting the predetermined target and the driving status;

a notification unit which notifies the driver of the driving evaluation result indicating a result of the driving evaluation; and a notification control unit which notifies the driver by way of the notification unit of the outside-world detection result or the driving status, based on the driving evaluation result, when the driving evaluation improves.

2. The driving support device according to claim 1, wherein the driving evaluation unit stores transitions in driving evaluation of the driver based on the outside-world detection result and the driving status in a storage unit, wherein the driving support device further includes a driving evaluation determination unit which determines that the driving evaluation improved, in the case of the outside-world detection result and the driving status matching a first condition, and determines that the driving evaluation declined in a case of the outside-world detection result and the driving status matching a second condition, wherein the notification control unit notifies the driver by way of the notification unit of the driving evaluation result indicating that the driving evaluation improved in a case of being determined that the driving evaluation improved, and does not notify the driver by way of the notification unit of the driving evaluation result indicating that the driving evaluation declined in a case of being determined that the driving evaluation declined, wherein the driving evaluation determination unit determines that the driving evaluation declined by two levels, in a case of the outside-world detection result and the driving status matching the second condition a plurality of times within a predetermined time period, and wherein the notification control unit performs a warning to the driver by way of the notification unit, in case of the driving evaluation declining by two levels.

3. The driving support device according to claim 2, wherein the driving evaluation determination unit determines that the driving evaluation declined, in a case of the outside-world detection result and the driving status matching the second condition, and wherein the notification control unit notifies the driver by way of the notification unit of the driving evaluation result indicating that the driving evaluation declined, and the outside-world detection result or the driving status based on the driving evaluation result, after stopping of the moving body.

4. The driving support device according to claim 2, further comprising a communication unit which communicates with an external terminal, wherein the notification control unit sends the driving evaluation result to the external terminal by way of the communication unit, and notifies the driving evaluation result and the outside-world detection result or the driving status based on the driving evaluation result to the external terminal.

5. The driving support device according to claim 2, wherein the first condition includes a relative distance between the moving body and a forward vehicle traveling ahead of the moving body becoming at least a predetermined distance, and traveling at the predetermined distance or more for a predetermined time period, and wherein the second condition includes a relative distance from the forward vehicle becoming no more than a predetermined distance, or accelerating the moving body at an acceleration of at least a predetermined acceleration.

* * * * *